(No Model.)
C. L. SCHALITZ.
STILL.
No. 460,365. Patented Sept. 29, 1891.
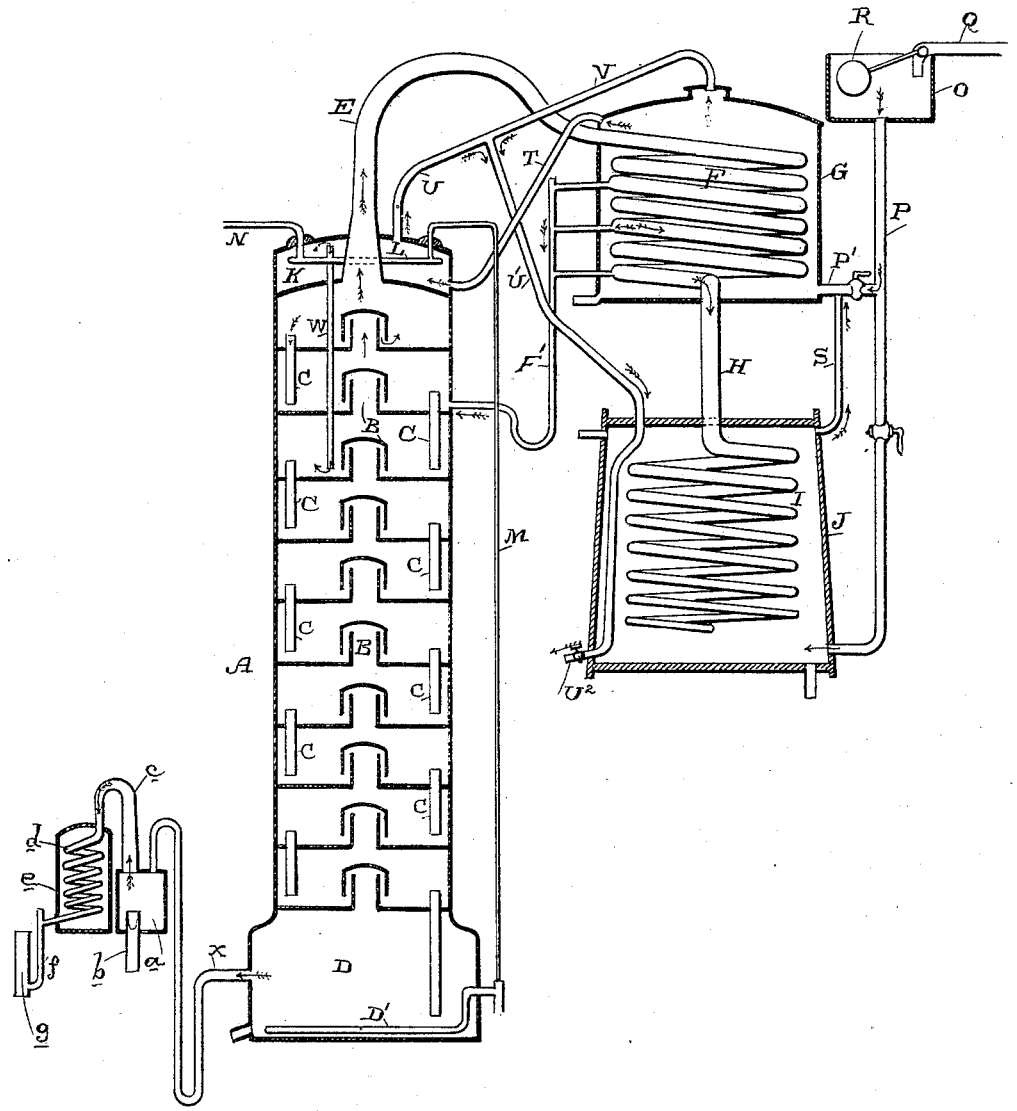
Witnesses,
Inventor,
Carl L. Schalitz
By Dewey & Co
attys

UNITED STATES PATENT OFFICE.

CARL L. SCHALITZ, OF SAN FRANCISCO, CALIFORNIA.

STILL.

SPECIFICATION forming part of Letters Patent No. 460,365, dated September 29, 1891.

Application filed November 21, 1890. Serial No. 372,241. (No model.)

*To all whom it may concern:*

Be it known that I, CARL L. SCHALITZ, a citizen of the United States, residing in the city and county of San Francisco, State of California, have invented an Improvement in Stills; and I hereby declare the following to be a full, clear, and exact description of the same.

My invention relates to certain improvements in distilling apparatus, such as is employed for the extraction of brandy or alcoholic products from wine or other material containing it; and it consists in certain attachments to the still, whereby the wine or other liquid may be deprived of the aldehydes and other ethereal and objectionable substances which are usually carried over with the brandy or other distillate, and which are injurious thereto.

It also consists in an attachment by which I am enabled to determine what proportion, if any, of alcohol remains in the residue which is discharged from the still.

Referring to the accompanying drawing for a more complete explanation of my invention, the figure is a view of my improved still.

My present invention is shown as applied to what are known as "continuous stills."

A is the column, having a series of chambers and floors with traps B and overflow-pipes C, leading from one floor to the other, and a steam or heating coil D' in the lowermost chamber D of the column.

E is the outlet-pipe leading from the upper chamber of the column to the condensing-worm F, which is contained in the tube G.

F' represents return-pipes between the worm F and column A. From the lower end of the worm F a pipe H connects with the second worm I, contained within the tub J.

The features thus far described are common to stills of this class, and not separately claimed as my invention.

Above the upper chamber of the column proper of the still is formed a chamber K, having within it a steam-coil L, by which any desired amount of heat may be imparted to the contents of the chamber K.

M is a pipe connecting with the common source of supply from which steam is admitted to the coil D' and the coil L, and N is an exhaust-pipe for the steam from the coil L.

O is a tank containing wine or other liquid which is to be distilled, and P is a pipe leading downward from this containing-tank. This tank is placed above the level of the worm-tub G, and also above the chamber K at the top of the distilling column, and it may be supplied automatically by means of an inlet-pipe Q, the supply being regulated by an ordinary float-valve R or by other suitable means. The wine is allowed to flow from the tank O through the pipe P, and may be discharged into the lower worm-tub J, where it surrounds the coil I and serves to condense the vapors within the coil, after which it passes upward through the pipe S and is delivered into the upper worm-tub G, where it surrounds the condensing-coil F, and is there raised in temperature by reason of its contact with the coil F, and, overflowing from the tub G, it passes through the pipe T and is delivered into the chamber K at the head of the column, the height of the supply-tank causing the liquid to flow by gravitation.

It will be manifest that by means of a stop-cock in the pipe P the wine may be prevented from passing into the tub J, and by means of a branch pipe P' it may be delivered directly into the tub G, this being done when it is desired to use water for condensing in the lower tub J; but I have found it very satisfactory to pass the wine through both the tubs, where it acts to cool the condensing-coils and is itself at the same time raised to a considerable temperature before it passes through the pipe T into the chamber K. When it reaches this chamber, the temperature is still further raised by means of the steam-coil L until the aldehydes and ethers which it is desired to separate from the wine are vaporized, and the vapors thus produced will pass out of the top of the chamber K through the pipe U. The pipe U discharges into the pipe U', and this pipe extends down through the condensing-tub J and is provided at its lower end with a draw-off cock or valve, so that the vapors within it may be condensed and be discharged in a liquid form at the lower end of the pipe $U^2$.

From the top of the tub G a pipe V leads and connects with the pipe U', so that if the temperature in the tub G should be raised sufficiently to form any vapor at this point it would be carried into the pipe U' and thence into the discharge at U².

W is an overflow-pipe leading from the chamber K into one of the chambers within the column A. The upper end of the pipe W is very near the top of the chamber K, so that the wine or other liquid within this chamber will overflow into the pipe W and thence pass down into the still proper, where it undergoes the operations usually carried on in this portion of the still.

A pipe X opens from the side of the chamber D, which contains the steam-coil D', and the liquid which descends to the chamber D after the alcohol has been extracted by the operations in the upper part of the column passes through the pipe X into a reservoir $a$. A trap-pipe $b$ opens out of the bottom of this reservoir, and through this pipe the liquid which passes into the reservoir may flow out. Any vapor arising from this liquid, which is still hot, passes out through a pipe $c$, opening from the top of the reservoir $a$, and is condensed in a coil $d$, contained within a condensing-tub $e$. The lower end of the coil $d$ discharges through the pipe $f$ into a vertical test pipe or tube $g$, and within this pipe this condensed liquid may be tested to determine whether any alcohol still remains in it or whether the operations within the column must be changed by reason of a loss of alcohol. By this construction I greatly improve the quality of the products of the still, removing the objectionable aldehydes and ethers and providing a test for the completeness of the extraction of alcohol, which furnishes a guide to the work.

Having thus described my invention, what I claim as new, and desire to secure by Letters Patent, is—

1. In a still having a main column with traps and overflow-pipes, a pipe for conducting vapors from the column, a heating-coil in the lower part of the column, a supplemental chamber in the upper end of the column, a heating-coil therein having an exhaust-pipe and a pipe connecting the upper coil with the lower coil, a supply-pipe leading to the supplemental chamber, an overflow-pipe from said chamber to the upper part of the column, and a pipe U, leading from the supplemental chamber, by which the vapors are discharged from the liquid before it is delivered into the still, substantially as herein described.

2. In a still, the combination, with a main column with traps and overflow-pipes, lower heating-coil, and a worm connected with the outlet-pipe of the column, of a supplemental chamber in the upper part of the column, a heating-coil therein having an exhaust-pipe and a pipe connecting it with the lower coil, an overflow-pipe from the chamber to the upper portion of the column, a supply-tank having a valve-controlled pipe leading therefrom to the worm-tub, an overflow-pipe leading from the upper portion of the tub to the lower portion of the supplemental chamber, a vapor-discharge pipe connecting with the upper portions of the tub and supplemental chamber, and a pipe U', connecting with said vapor-discharge pipe at a point between the chamber and tub and provided with a draw-off cock, substantially as herein described.

3. In a still, the combination, with a main column having traps and overflow-pipes and a pipe for conducting the vapors from the column, of a supplemental chamber in the upper portion of the column, a heating-coil in said chamber, two connected condensing worm-tubs situated one above the other and each having a worm, a supply-tank and connections therefrom to the worm-tubs, a pipe connection between the upper end of the upper worm-tub and the supplemental heating-chamber, a pipe U', leading from said pipe connection through the lower condensing-tub and having a draw-off cock, and a pipe T for delivering the liquid from the upper tub to the supplemental heating-chamber at the head of the column, substantially as herein described.

4. A distilling apparatus consisting of a main column, a supply-tank, a supplemental chamber at the upper portion of the column with means for delivering the liquid to be distilled therein, means for heating the liquid within the chamber, pipes through which the volatile vapors may be conveyed away to a point of discharge, and an overflow-pipe through which the liquid may be delivered from the supplemental chamber into one of the upper chambers of the column, a pipe X, leading from the lower portion of the column, a closed chamber into which the liquid from the lowermost chamber of the still is delivered by said pipe, an overflow-discharge pipe connected with the closed chamber, a vapor-pipe leading from the upper part of the closed chamber, a condensing-coil connecting with the vapor-pipe, and a receiver into which the condensed liquid is delivered so as to be tested therein, substantially as herein described.

In witness whereof I have hereunto set my hand.

CARL L. SCHALITZ.

Witnesses:
S. H. NOURSE,
H. C. LEE.